(12) United States Patent
Wen et al.

(10) Patent No.: US 12,352,365 B1
(45) Date of Patent: Jul. 8, 2025

(54) INTEGRATED AIR VALVE

(71) Applicant: TangTring Seating Technology Inc., Huizhou Guangdong (CN)

(72) Inventors: Tsun-Hsiang Wen, Taipei (TW); Shih-Chung Hsu, Taipei (TW); Chia-Yu Yu, Taipei (TW); Peng Zhao, Huizhou Guangdong (CN)

(73) Assignee: TangTring Seating Technology Inc., Huizhou (CN)

( * ) Notice: Subject to any disclaimer, the term of this patent is extended or adjusted under 35 U.S.C. 154(b) by 46 days.

(21) Appl. No.: 18/398,927

(22) Filed: Dec. 28, 2023

(51) Int. Cl.
*F16K 31/00* (2006.01)
*F16K 11/22* (2006.01)
*F16K 31/02* (2006.01)

(52) U.S. Cl.
CPC .......... *F16K 31/002* (2013.01); *F16K 11/22* (2013.01); *F16K 31/025* (2013.01)

(58) Field of Classification Search
CPC .......... F16K 31/002; F16K 1/165; F16K 1/36; F16K 31/025; F16K 11/10; F16K 11/22
See application file for complete search history.

(56) References Cited

U.S. PATENT DOCUMENTS

| | | | |
|---|---|---|---|
| 6,499,509 B2 | 12/2002 | Berger et al. | |
| 10,753,494 B2 | 8/2020 | Beuschel et al. | |
| 2019/0309871 A1* | 10/2019 | Dörfler | F16K 31/025 |
| 2019/0353266 A1* | 11/2019 | Dörfler | F16K 31/025 |
| 2020/0101883 A1* | 4/2020 | Beuschel | F16K 11/22 |
| 2020/0103047 A1* | 4/2020 | Beuschel | F16K 31/025 |
| 2022/0074394 A1* | 3/2022 | Koepfer | F16K 11/22 |
| 2023/0125583 A1* | 4/2023 | Pagel | F16K 31/025 137/625.48 |
| 2023/0392707 A1* | 12/2023 | Wen | F16K 27/003 |

FOREIGN PATENT DOCUMENTS

| | | | | |
|---|---|---|---|---|
| CN | 105829164 A | | 8/2016 | |
| CN | 110023663 A | | 7/2019 | |
| CN | 110100125 A | | 8/2019 | |
| CN | 110966423 A | | 4/2020 | |
| CN | 110966424 A | | 4/2020 | |
| DE | 102017217213 B3 | * | 3/2019 | |
| DE | 102021203190 A1 | * | 10/2022 | |
| WO | WO-2018065217 A1 | * | 4/2018 | F03G 7/065 |
| WO | 2019149498 A1 | | 8/2019 | |
| WO | WO-2023169634 A1 | * | 9/2023 | B60N 2/914 |

* cited by examiner

*Primary Examiner* — Marina A Tietjen
(74) *Attorney, Agent, or Firm* — Nicholas Makridakis

(57) ABSTRACT

An integrated air valve includes a hollow shell formed with a valve installation space, two air holes respectively an air inlet hole and an exhaust hole communicated to the space, and two support members; two lever members; and two shape memory alloy members. The lever member uses one of the support members as a fulcrum. The lever member includes an actuating end, and an action end capable of closing the air hole. A part of the shape memory alloy members are hung on the actuating ends of the lever members, and capable of driving the lever members based on an energized state. One of the lever members determines conduction of the air inlet hole to achieve air intake, the other lever member determines whether the exhaust hole communicates to an external space to achieve exhaust, and the lever members determine whether the integrated air valve enters air pressure maintenance.

12 Claims, 7 Drawing Sheets

INTEGRATED AIR VALVE

FIELD OF THE INVENTION

The invention relates to an integrated air valve, and more particularly to an integrated air valve capable of using shape memory alloy members to produce switching.

BACKGROUND OF THE INVENTION

Many existing air valves use shape memory alloy members for switching, such as U.S. Pat. Nos. 6,499,509, 10,753,494, WO 2019149498, CN 110966424, CN 110966423, CN 110100125, CN 110023663, CN 105829164.

The control mechanism of the above-mentioned air valves is implemented by utilizing the shape memory effect (SME) produced by the shape memory alloy members at different temperatures. When the shape memory alloy is below the phase transition temperature (for example, at room temperature), it has a martensite structure. This metallographic structure enables the shape memory alloy to deform after receiving an exogenic action, and the shape memory alloy can continue to maintain the deformation after the external force is removed. When the shape memory alloy is heated to a temperature higher than the phase transition temperature, the metallographic structure of the shape memory alloy changes from a martensite structure to an austenite structure. The shape memory alloy releases stress and returns to its original state before deformation through changes in metallographic structure.

In the above disclosed patents, the valve element is driven through contraction of the metal alloy wire after being energized and heated, so that the valve element can release or close the valve port based on the energized state of the metal alloy wire. Among the above disclosed patents, although U.S. Pat. No. 10,753,494 discloses that switching between the air inlet hole and the exhaust hole is determined based on the swing of the valve body, when the metal alloy wire is not energized and heated, the valve body releases the air inlet hole and closes the exhaust hole to realize the air intake of the air valve; on the contrary, when the metal alloy wire is energized and heated, the valve body closes the air inlet hole and releases the exhaust hole to realize the exhaust of the air valve; a technical solution of using the single valve body to control the two air holes in U.S. Pat. No. 10,753,494 makes it impossible for the air valve to realize the maintain state, but can only switch between the air intake state and the exhaust state, and operation of the single valve body is prone to have structural fatigue problems. In addition, the two air holes in U.S. Pat. No. 10,753,494 must be provided at the two ends of the valve body, if the height of the support member on the valve body used as the fulcrum during swing is insufficient, the air cannot be released quickly, which is not conducive to mattresses and other objects that need to be equipped with a large amount of air. On the contrary, if the height of the support member or the length of the valve body is increased in order to accelerate air release, the overall volume of the valve will be greatly increased, which deviates from the technical objective of reducing the installation space required for existing air valves.

SUMMARY OF THE INVENTION

A main object of the invention is to solve the problem that the conventional air valves do not have a maintenance state.

Another object of the invention is to solve the problem that the conventional air valve structures are not conducive to quick release of a large amount of air.

In order to achieve the above objects, the invention provides an integrated air valve comprising a hollow shell, two lever members and two shape memory alloy members, the hollow shell forms a valve installation space, two air holes communicated to the valve installation space, and two support members located in the valve installation space, the two air holes are respectively an air inlet hole and an exhaust hole. The two lever members are disposed in the valve installation space, each of the two lever members uses one of the support members as a fulcrum, each of the two lever members has an actuating end, and an action end opposite to the actuating end and capable of closing one of the two air holes. The two shape memory alloy members are disposed in the valve installation space, each of the two shape memory alloy members is partly hung on the actuating end of one of the two lever members, each of the two shape memory alloy members causes one of the two air holes faced by the action end of one of the two lever members to be released or closed based on an energized state. Wherein one of the two lever members determines conduction of the air inlet hole to achieve air intake, the other of the two lever members determines whether the exhaust hole is communicated to an external space to achieve exhaust, and the two lever members jointly determine whether the integrated air valve enters air pressure maintenance.

In one embodiment, each of the two support members is disposed adjacent to the action end of one of the two lever members.

In one embodiment, each of the two support members is formed with an arc-shaped slot, and each of the two lever members comprises an assembly block disposed in the arc-shaped slot.

In one embodiment, the two air holes are located at two sides opposite to each other of the valve installation space respectively.

In one embodiment, each of the two lever members comprises a mounting slot disposed at the actuating end and provided for disposing one of the two shape memory alloy members.

In one embodiment, each of the two lever members opposite a maintenance block disposed at the actuating end and extending toward a bottom of the hollow shell, and the maintenance block is connected to one of the two shape memory alloy members.

In one embodiment, each of the two lever members opposite an air plug disposed at the action end and facing one of the two air holes, and an elastic member with the air plug located on two surfaces opposite to each other of the action end respectively.

In one embodiment, each of the two lever members has a first positioning block disposed at the action end and connected to one end of the elastic member, and the hollow shell comprises a second positioning block connected to another end of the elastic member.

In one embodiment, each of the two lever members comprises a connecting block disposed at the action end and provided for disposing the air plug.

Through the foregoing implementation of the invention, compared with the prior art, the invention has the following characteristics: each of the two lever members is disposed corresponding to one of the two air holes, and each of the two lever members is driven by one of the two shape memory alloy members to enable each of the two lever members capable of being independently controlled and swinging, thereby enabling the two air holes to achieve air intake and exhaust respectively, or the integrated air valve to achieve air pressure maintenance.

DETAILED DESCRIPTION OF THE PREFERRED EMBODIMENTS

Figure 1:
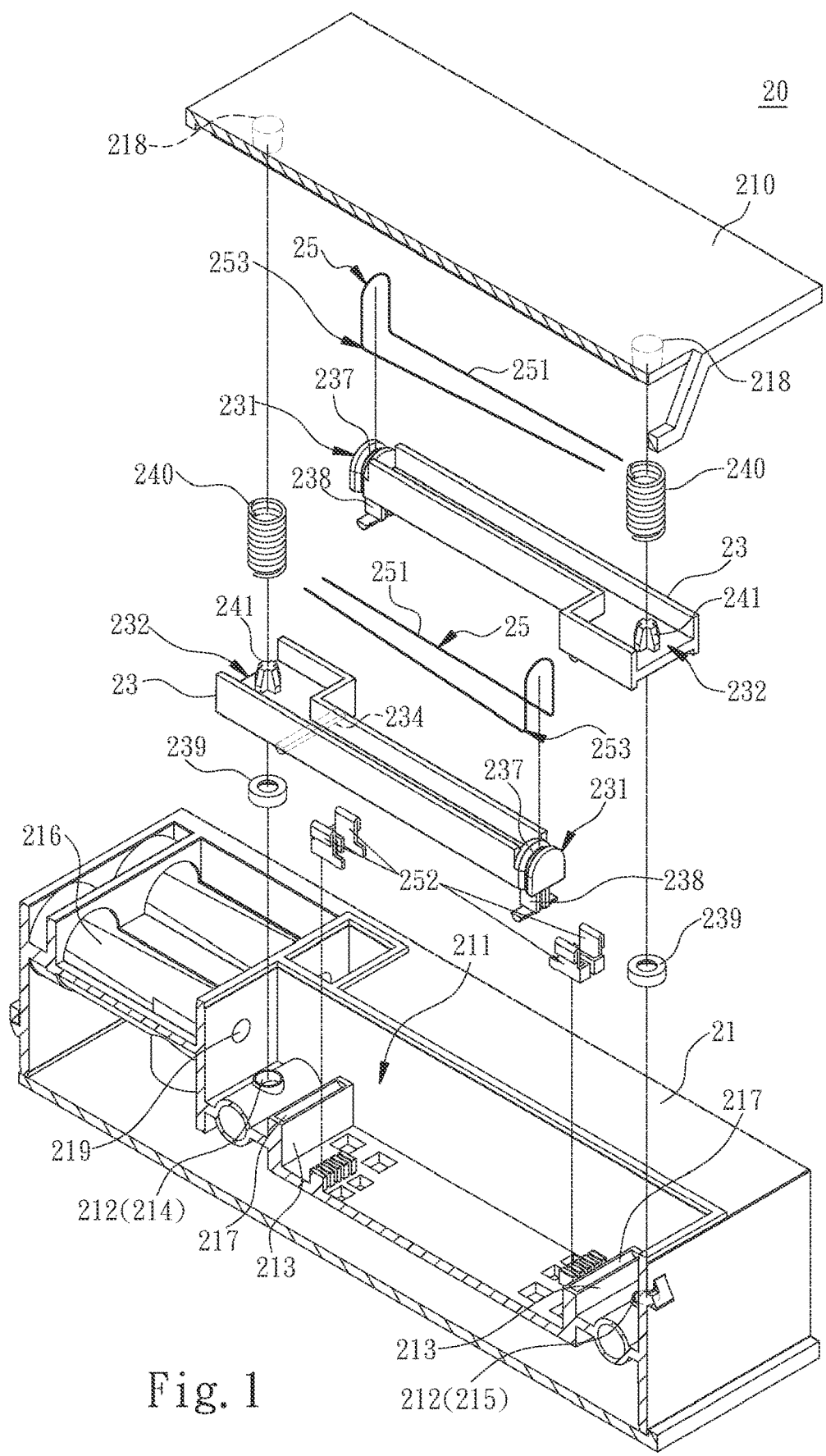
FIG. 1 is an exploded perspective view of an embodiment of the invention.
Figure 2:
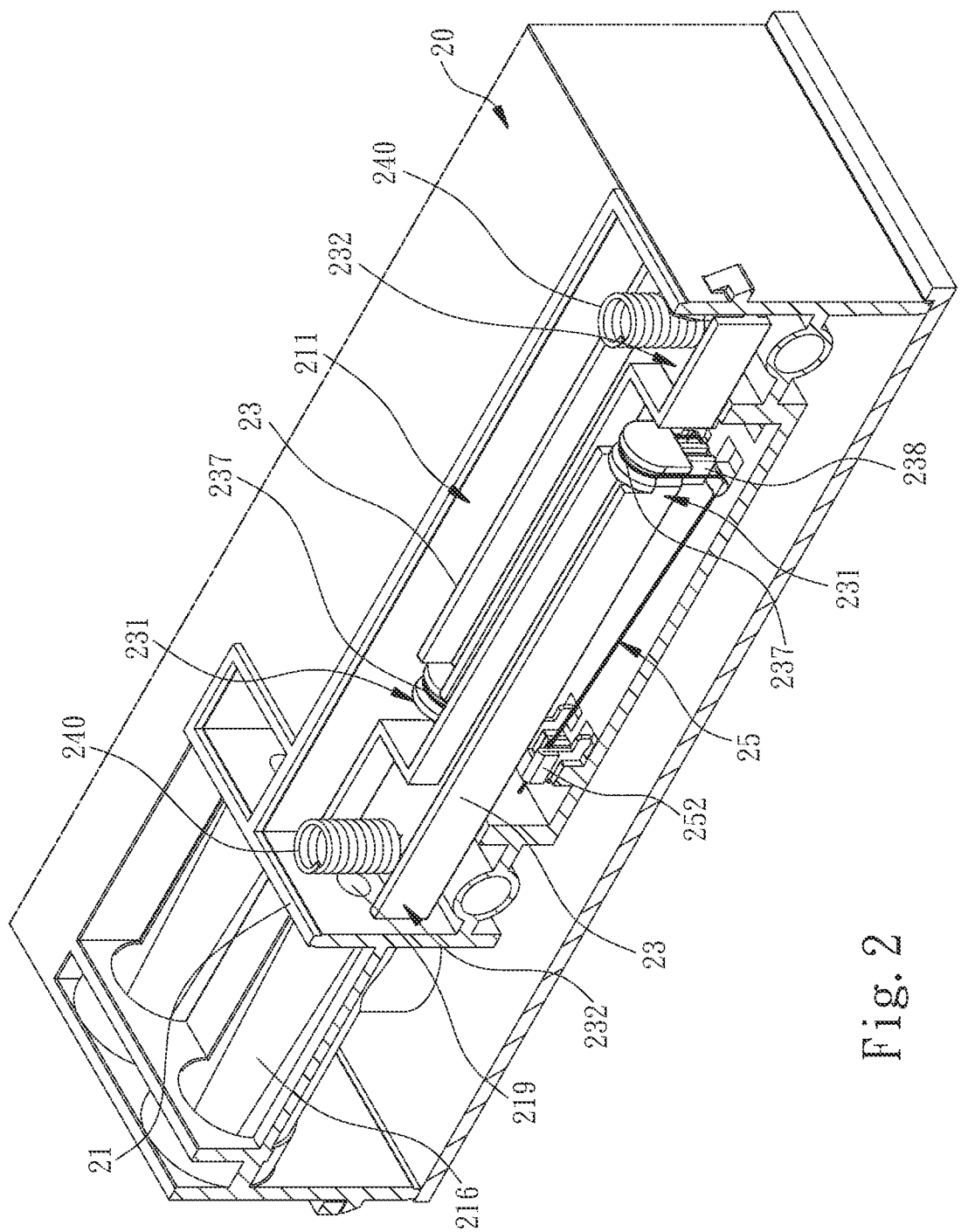
FIG. 2 is a first cross-sectional structural view of an embodiment of the invention.

The detailed description and technical content of the invention are described below with reference to the accompanying drawings.

Please refer to FIG. 1, FIG. 2, FIG. 3, and FIG. 4. The invention provides an integrated air valve 20 comprising a hollow shell 21, two lever members 23 and two shape memory alloy members 25. The hollow shell 21 is formed with a valve installation space 211, two air holes 212 and two support members 213. The valve installation space 211 is formed by at least one shell member 210 in an interior of the hollow shell 21. The two air holes 212 are disposed on the at least one shell member 210 and are respectively communicated to the valve installation space 211. The two air holes 212 are respectively an air inlet hole 214 and an exhaust hole 215. In addition, the two support members 213 are disposed in the valve installation space 211, and a height of each of the two support members 213 is smaller than a height of the valve installation space 211, that is, top edges of the two support members 213 do not contact the at least one shell member 210.

The two lever members 23 are disposed in the valve installation space 211. Each of the two lever members 23 uses one of the two support members 213 as a fulcrum. Each of the two lever members 23 comprises an actuating end 231, and an action end 232 opposite to the actuating end 231. The fulcrum referred to herein as a contact position between each of the two lever members 23 and one of the two support members 213, and is located between the actuating end 231 and the action end 232 of each of the two lever members 23. The fulcrum makes the actuating end 231 and the action end 232 of each of the two lever members 23 to be suspended. When either the actuating end 231 or the action end 232 is exerted with a force, the other one of the actuating end 231 and the action end 232 produces a corresponding motion based on the fulcrum. In addition, the invention uses the actuating end 231 of each of the two lever members 23 as a main force bearer, and the action end 232 is disposed corresponding to one of the two air holes 212, and can be driven by the actuating end 231, thereby changing states of the two air holes 212. More specifically, the action end 232 of each of the two lever members 23 comprises a first position of closing one of the two air holes 212, and a second position of releasing one of the two air holes 212.

The two shape memory alloy members 25 are disposed in the valve installation space 211 and capable of working based on an energized state. Each of the two shape memory alloy members 25 referred to herein is a metal wire 251 and a plurality of conductive members 252 forming a conductive relationship with the metal wire 251, and the metal wire 251 generates thermal contraction when the plurality of conductive members 252 supply an electric power. A part of each of the two shape memory alloy members 25 is hung on the actuating end 231 of one of the two lever members 23, and the actuating end 231 is driven to displace relative to the action end 232 after each of the two shape memory alloy members 25 is energized and contracted, so that the actuating end 231 switches between the first position and the second position, thereby causing one of the two air holes 212 facing the action end 232 of one of the two lever members 23 to be released or closed. It can be known from the above that the two shape memory alloy members 25 of the invention are controlled independently, in this way, movements of the two lever members 23 are not interlinked.

In addition, the integrated air valve 20 of the invention is capable of realizing air intake, exhaust or maintenance on a single air path. That is to say, the integrated air valve 20 is one of components constituting the air path, and a state of the integrated air valve 20 changes conditions in the air path. Further, in the invention, one of the two lever members 23 determines conduction of the air inlet hole 214 to achieve air intake, the other one of the two lever members 23 determines conduction of the exhaust hole 215 to achieve exhaust, and the two lever members 23 jointly determine whether the integrated air valve 20 enters air pressure maintenance.

Figure 4:
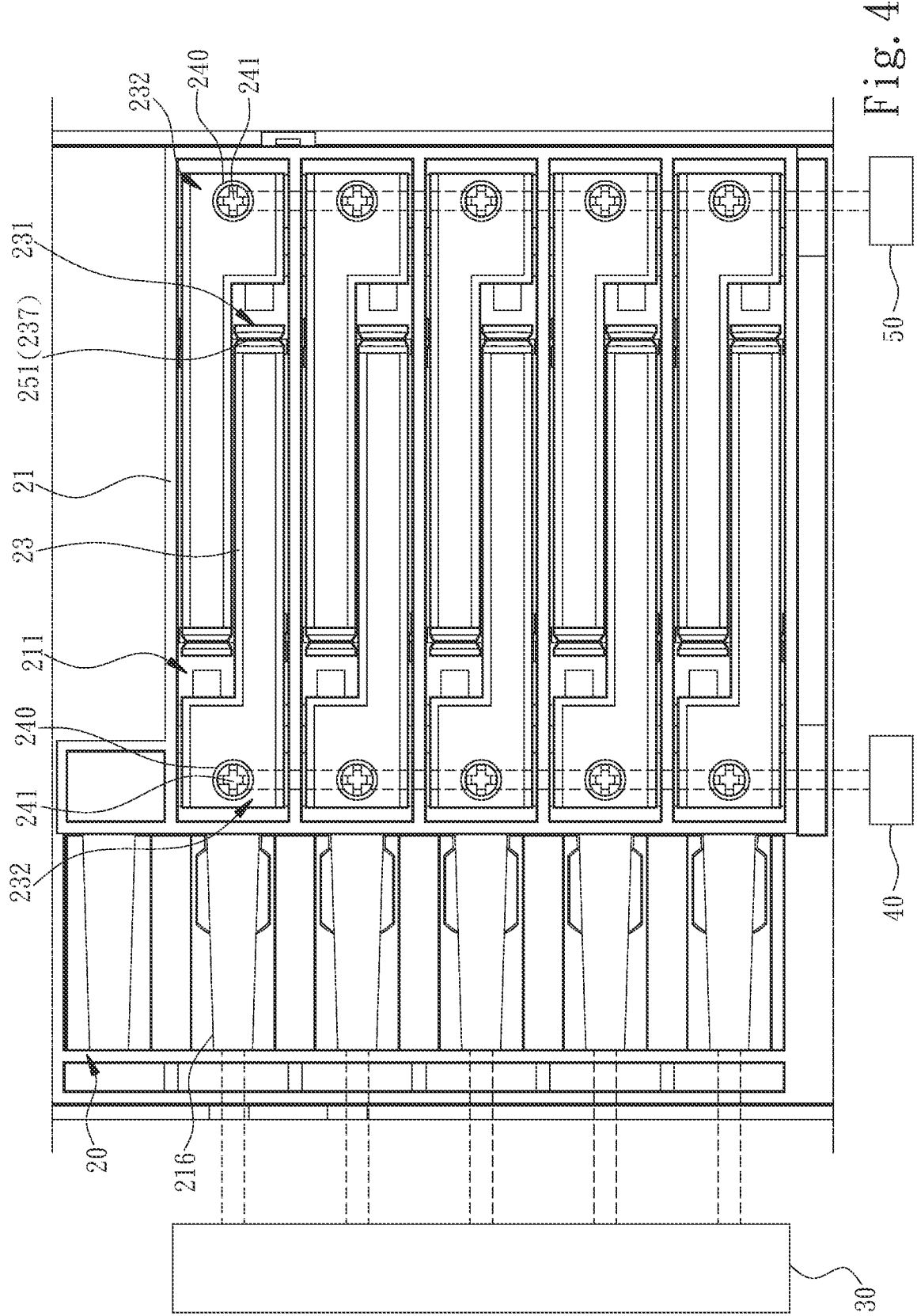
FIG. 4 is a schematic diagram of implementation of an embodiment of the invention.
Figure 5:
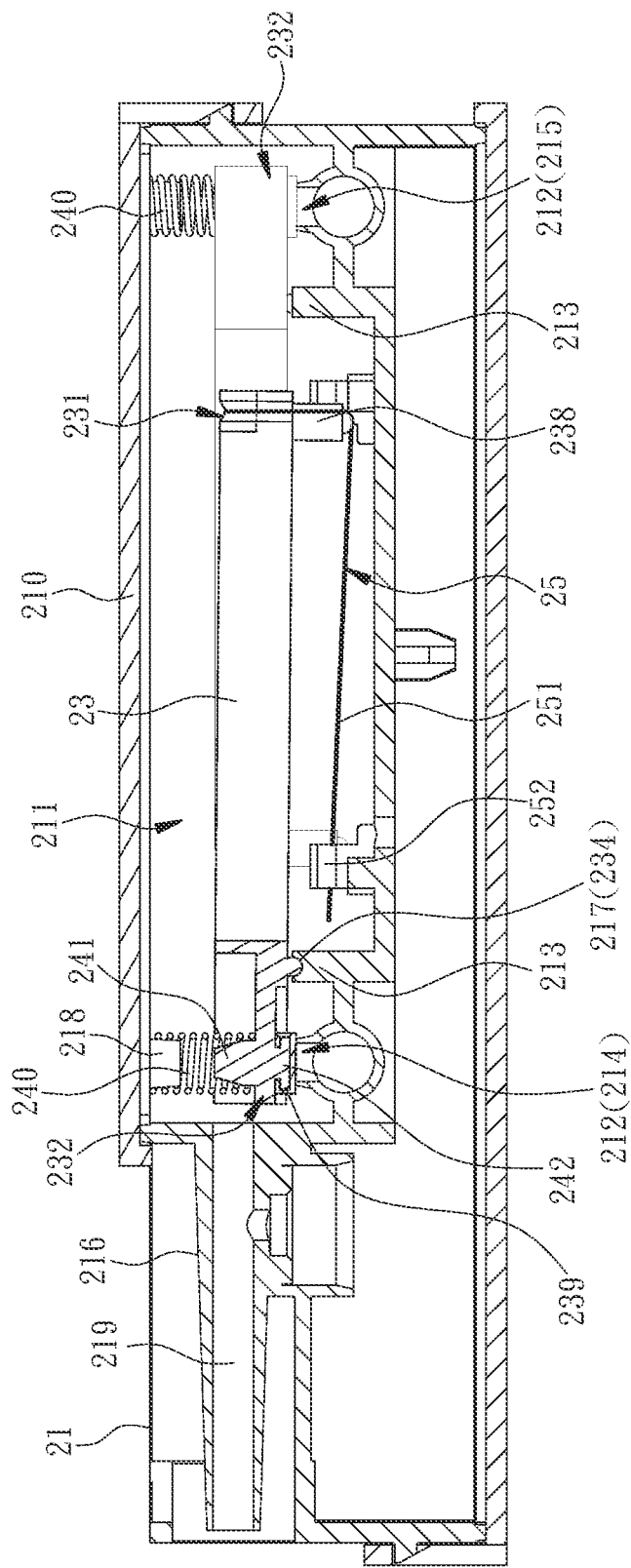
FIG. 5 is a second cross-sectional structural view of an embodiment of the invention.

At an initial stage of implementation of the integrated air valve 20, the integrated air valve 20 is equipped with an inflatable element 30 (such as an air bag). The hollow shell 21 comprises an airway 216 communicated to the inflatable element 30. The airway 216 is communicated to the valve installation space 211 through a through hole 219. The air inlet hole 214 is connected to an air supply source 40 (such as a pump) for air intake, and the exhaust hole 215 can be communicated to an external space (indicated by reference number 50) for exhaust. Assume that in a current state the two shape memory alloy members 25 are inactive, the action end 232 of each of the two lever members 23 is located in the first position, as shown in FIG. 4 and FIG. 5. Please refer to FIG. 4, FIG. 5, and FIG. 6, when the inflatable element 30 is to be inflated, one of the two shape memory alloy members 25 is energized and heated to contract, the actuating end 231 of one of the two lever members 23 disposed corresponding to the air inlet hole 214 is driven to lift the action end 232, and the action end 232 of one of the two lever members 23 is displaced from the first position to the second position. The air inlet hole 214 communicates with the inflatable element 30 through the valve installation space 211, the through hole 219 and the airway 216, and air provided by the air supply source 40 is capable of inflating the inflatable element 30, as shown by reference numeral 41.

Please refer to FIG. 4 and FIG. 5 again, when an air pressure in the inflatable element 30 is to be maintained, the two shape memory alloy members 25 on the integrated air valve 20 are not energized so that a plurality of action ends 232 of the two lever members 23 to be controlled at the first position to achieve air pressure maintenance.

Figure 7:
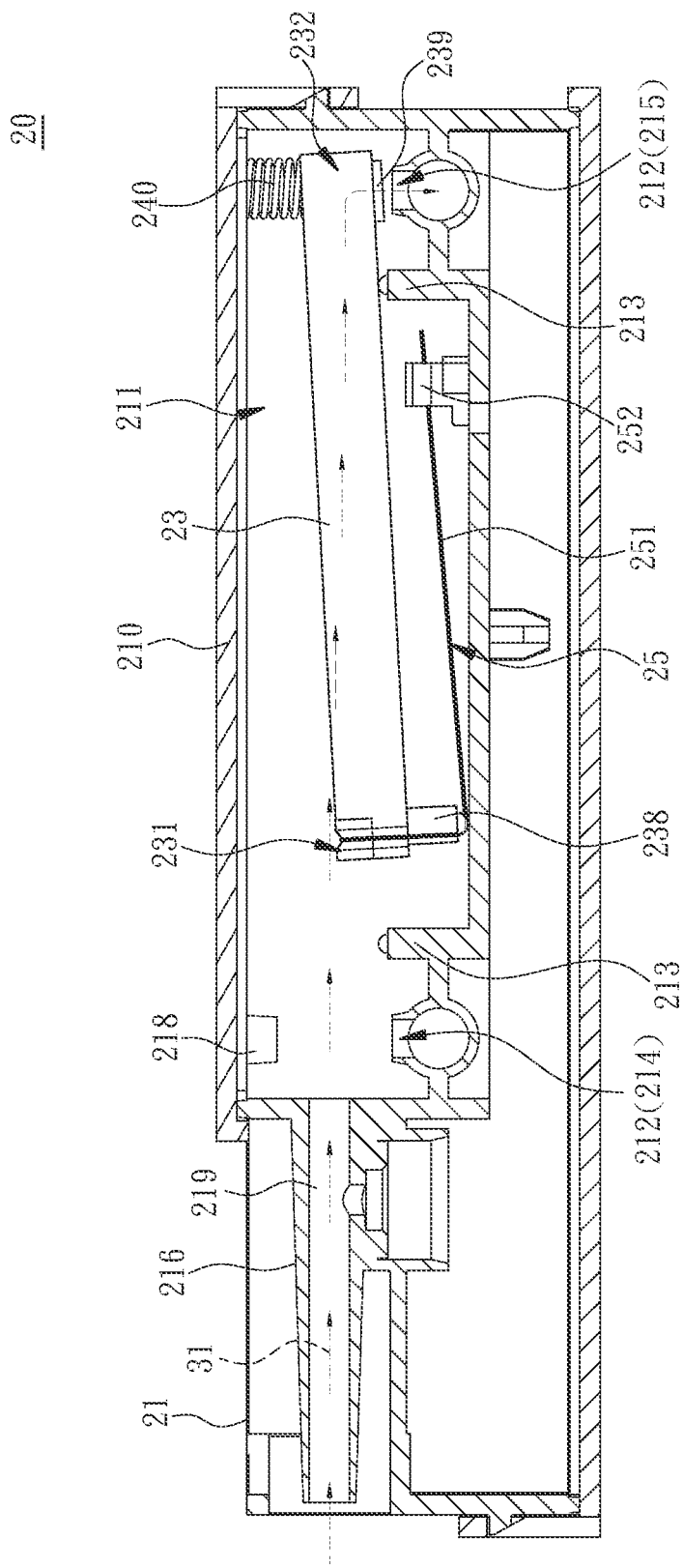
FIG. 7 is a fourth cross-sectional structural view of an embodiment of the invention.

Please refer to FIG. 4 and FIG. 7, when an air pressure in the inflatable element 30 is to be reduced, that is, the inflatable element 30 is to be deflated. The other one of the two shape memory alloy members 25 is energized, the actuating end 231 of one of the two lever members 23 disposed corresponding to the exhaust hole 215 is driven to lift the action end 232, the action end 232 of one of the two lever members 23 disposed corresponding to the exhaust hole 215 is displaced from the first position to the second position, the exhaust hole 215 is turned to open and communicates to the external space (indicated by reference number 50), so that air in the inflatable element 30 can be vented from the exhaust hole 215 through the airway 216, the through hole 219 and the valve installation space 211 in sequence, as shown by reference numeral 31.

It can be known from the foregoing that, in the invention, each of the two lever members 23 is disposed corresponding to one of the two air holes 212, and each of the two lever members 23 is driven by one of the two shape memory alloy members 25 to enable each of the two lever members 23 capable of being independently controlled and swinging to independently close one of the two air holes 212 to achieve air intake, air release or pressure maintenance function on a single air path.

Please refer to FIG. 5 again. In order to facilitate releasing the two air holes 212 by the two lever members 23 of the invention, each of the two support members 213 disposed adjacent to the action end 232. The so-called adjacent dispose means that a distance between each of the two support members 213 and the actuating end 231 of one of the two lever members 23 is greater than a distance between each of the two support members 213 and the action end 232 of one of the two lever members 23. In addition, each of the two support members 213 is formed with an arc-shaped slot 217, and a slot opening direction of the arc-shaped slot 217 faces one of the two lever members 23. Each of the two lever members 23 comprises an assembly block 234, wherein a surface of the assembly block 234 is arcuate and cooperates with the arc-shaped slot 217. The assembly block 234 is disposed in the arc-shaped slot 217 to enable the actuating end 231 and the action end 232 capable of moving relative to each other.

Figure 3:
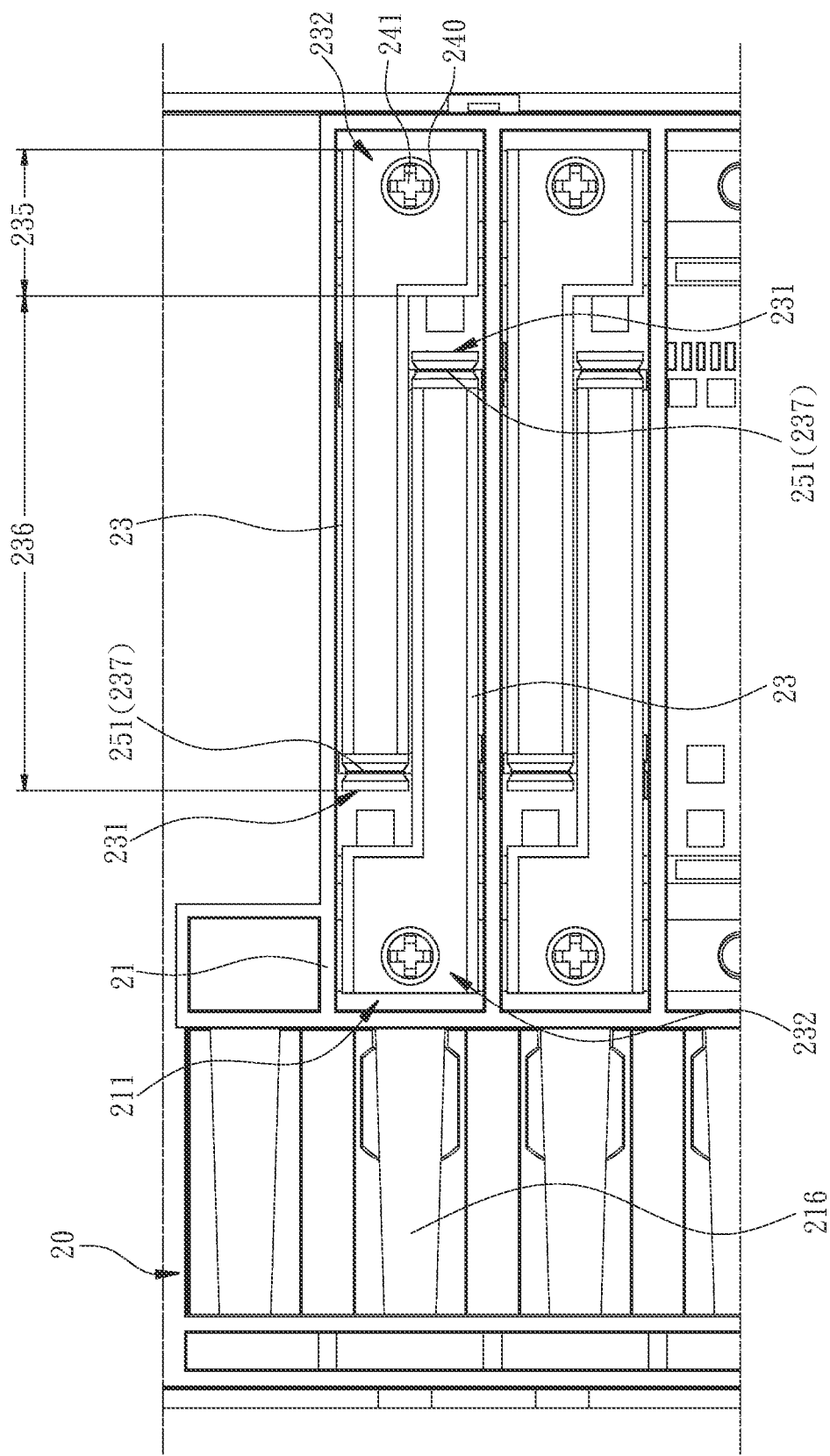
FIG. 3 is a plan view of an embodiment of the invention.

Please refer to FIG. 3, FIG. 4, and FIG. 5 again. In one embodiment of the invention, the two air holes 212 are respectively located at two sides opposite to each other of the valve installation space 211. Each of the two air holes 212 is closed by one of the two lever members 23. In addition, the two lever members 23 are arranged in rotational symmetry, that is, the two lever members 23 are located on a plane. After one of the two lever members 23 is rotated around a certain point on the plane, one of the two lever members 23 overlaps with the other one of the two lever members 23. In this embodiment, each of the two lever members 23 is divided into a head 235 provided with the action end 232 and facing one of the two air holes 212, and a body 236 connected to the head 235 and provided with the actuating end 231. From the perspective of FIG. 3, the head 235 is larger than the body 236. Two heads 235 of the two lever members 23 are respectively located at the two sides opposite to each other of the valve installation space 211 to reduce a volume of the valve installation space 211.

Please refer to FIG. 2, FIG. 5, FIG. 6, and FIG. 7. In another embodiment, each of the two lever members 23 comprises a mounting slot 237 disposed at the actuating end provided for disposing one of the two shape memory alloy members 25 therein to prevent one of the two shape memory alloy members 25 from falling off. Further, each of the two lever members 23 comprises a maintenance block 238, the maintenance block 238 is disposed at the actuating end 231 and extends toward a bottom of the hollow shell 21. The maintenance block 238 is connected to one of the two shape memory alloy members 25 and capable of maintaining a state in which one of the two shape memory alloy members 25 contracts after being heated. In this embodiment, each of the two shape memory alloy members 25 comprises a bend 253, and the bend 253 is generated based on an assembly of the maintenance block 238 and one of the two shape memory alloy members 25. In addition, the maintenance block 238 can also be provided with the mounting slot 237 to limit assembly of one of the two shape memory alloy members 25 thereon.

Figure 6:
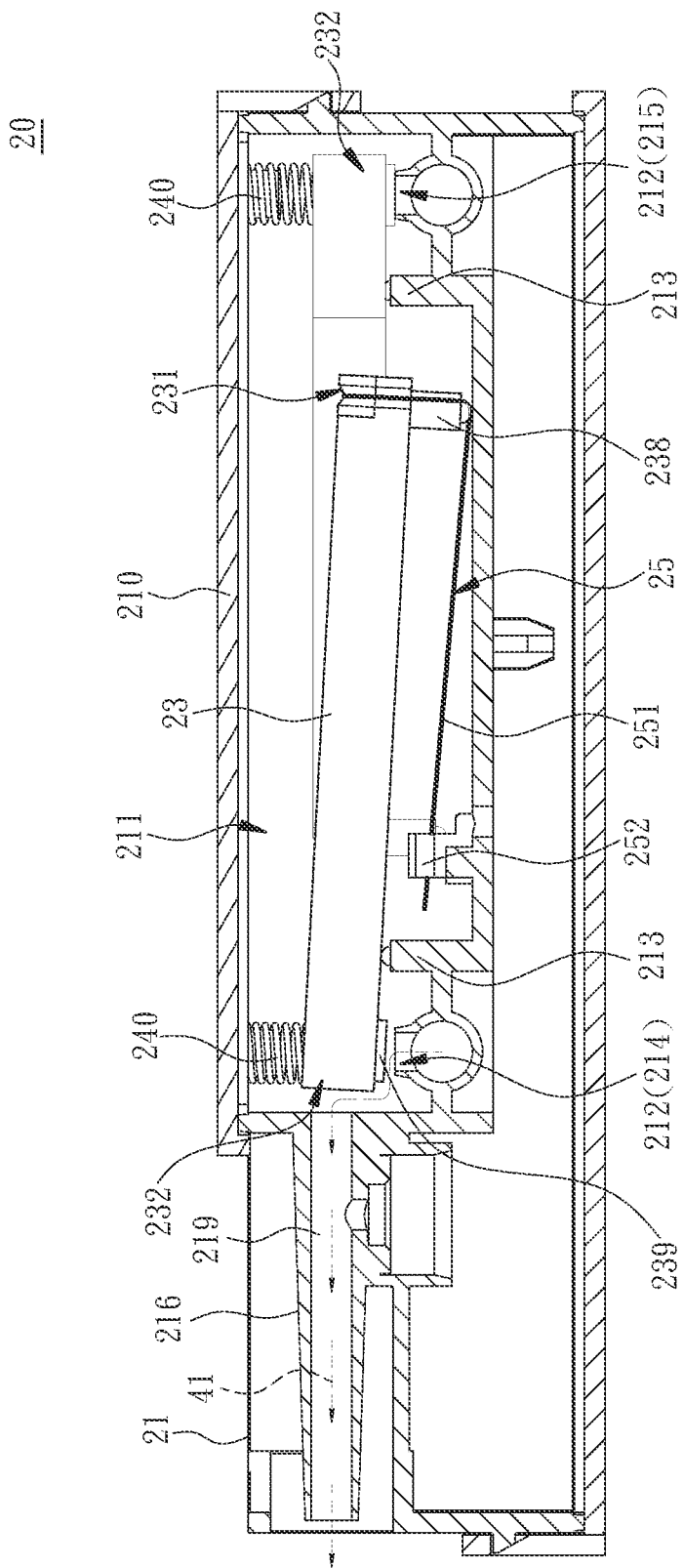
FIG. 6 is a third cross-sectional structural view of an embodiment of the invention.

Please refer to FIG. 5, FIG. 6, and FIG. 7 again. In one embodiment, each of the two lever members 23 comprises an air plug 239 and an elastic member 240. The air plug 239 is provided at the action end 232 and faces one of the two air holes 212. The air plug 239 is provided for blocking one of the two air holes 212. The elastic member 240 and the air plug 239 are located on two surfaces opposite to each other of the action end 232 respectively. The elastic member 240 is compressed when the action end 232 is displaced from the first position to the second position, and stores an elastic return force. The elastic member 240 releases the elastic return force accumulated when the actuating end 231 is not exerted with force, and the action end 232 is pushed to move from the second position to the first position. In order to provide positioning for the elastic member 240, each of the two lever members 23 comprises a first positioning block 241 connected to one end of the elastic member 240, and the hollow shell 21 comprises a second positioning block 218 connected to the other end of the elastic member 240. The first positioning block 241 is located on the action end 232 of each of the two lever members 23, and the second positioning block 218 is provided on the at least one shell member 210 of the hollow shell 21 and extends towards the valve installation space 211. In addition to the above, each of the two lever members 23 comprises a connecting block 242 provided for disposing the air plug 239. The connecting block 242 is located on a side of the action end 232 facing one of the two air holes 212.

What is claimed is:
1. An integrated air valve, comprising:
a hollow shell formed with a valve installation space, two air holes respectively communicated to the valve installation space, and two support members located in the valve installation space, the two air holes being an air inlet hole and an exhaust hole respectively;
two lever members disposed in the valve installation space, each of the two lever members is configured to adopt one of the support members as a fulcrum, each of the two lever members comprising an actuating end, and an action end opposite to the actuating end and capable of closing one of the two air holes; and
two shape memory alloy members disposed in the valve installation space, a part of each of the two shape memory alloy members being hung on the actuating end of one of the two lever members, each of the two shape memory alloy members is configured to release or close one of the two air holes facing the action end of one of the two lever members based on an energized state;
wherein one of the two lever members determines conduction of the air inlet hole to achieve air intake, the other one of the two lever members determines whether the exhaust hole is communicated to an external space to achieve exhaust, and the two lever members jointly determine whether the integrated air valve enters air pressure maintenance.

2. The integrated air valve as claimed in claim 1, wherein each of the two support members is disposed adjacent to the action end of one of the two lever members.

3. The integrated air valve as claimed in claim 2, wherein each of the two support members is formed with an arc-shaped slot, and each of the two lever members comprises an assembly block disposed in the arc-shaped slot.

4. The integrated air valve as claimed in claim 2, wherein the two air holes are respectively located at two sides opposite to each other of the valve installation space.

5. The integrated air valve as claimed in claim 1, wherein each of the two lever members comprises a mounting slot disposed at the actuating end and provided for disposing one of the two shape memory alloy members.

6. The integrated air valve as claimed in claim 5, wherein each of the two lever members comprises a maintenance block disposed at the actuating end and extending toward a bottom of the hollow shell, and the maintenance block is connected to one of the two shape memory alloy members.

7. The integrated air valve as claimed in claim 5, wherein each of the two lever members comprises an air plug disposed at the action end and facing one of the two air holes, and an elastic member with the air plug respectively located on two surfaces opposite to each other of the action end.

8. The integrated air valve as claimed in claim 7, wherein each of the two lever members comprises a first positioning block disposed at the action end and connected to one end of the elastic member, and the hollow shell comprises a second positioning block connected to another end of the elastic member.

9. The integrated air valve as claimed in claim 7, wherein each of the two lever members comprises a connecting block disposed on a side of the action end and provided for disposing the air plug.

10. The integrated air valve as claimed in claim 1, wherein each of the two lever members comprises an air plug disposed at the action end and facing one of the two air holes, and an elastic member with the air plug respectively located on two surfaces opposite to each other of the action end.

11. The integrated air valve as claimed in claim 10, wherein each of the two lever members comprises a first positioning block disposed at the action end and connected to one end of the elastic member, and the hollow shell comprises a second positioning block connected to another end of the elastic member.

12. The integrated air valve as claimed in claim 10, wherein each of the two lever members comprises a connecting block provided for disposing the air plug.

* * * * *